May 22, 1923.

V. W. PAGÉ

LAMP SUPPORT

Filed Jan. 6, 1922

1,456,459

WITNESSES

INVENTOR
VICTOR W. PAGÉ
BY
ATTORNEYS

Patented May 22, 1923.

1,456,459

UNITED STATES PATENT OFFICE.

VICTOR W. PAGÉ, OF KEW GARDENS, NEW YORK.

LAMP SUPPORT.

Application filed January 6, 1922. Serial No. 527,513.

*To all whom it may concern:*

Be it known that I, VICTOR W. PAGÉ, a citizen of the United States, and a resident of the city of New York, Kew Gardens, borough of Queens, in the county of Queens and State of New York, have invented a new and Improved Lamp Support, of which the following is a full, clear, and exact description.

The present invention relates to new and useful improvements in headlights for motor vehicles, and it pertains more particularly to a new and improved form of mount for securing the headlight in operative position.

It is one of the primary objects of the invention to provide a new and improved means for mounting headlights, which permits of the adjustment of the headlights relative to their mount.

It is a further object of the invention to provide a headlight mount in which the headlight may be bodily removed from its mount at will.

It is a still further object of the invention to construct a vehicle lamp support in such a manner that the lamp is adjustable to the radiator shell.

With the above and other objects in view, reference is had to the accompanying drawings, in which—

Figure 1:
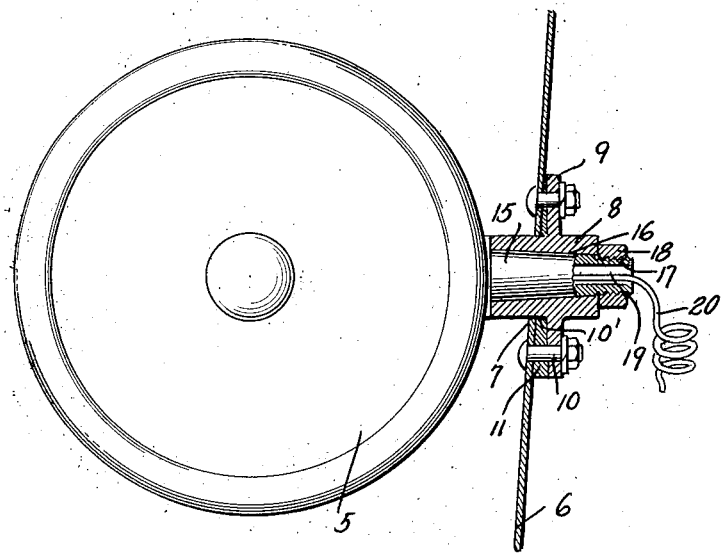
Figure 1 is a view in elevation of a vehicle lamp, the radiator shell of the vehicle and lamp support being shown in section and partly broken away.

Referring more particularly to the drawings, the reference character 5 designates the vehicle lamp, and 6 designates a section of the radiator shell.

In carrying out the invention the radiator shell is provided with an opening 7, and extending through said opening 7 is a bushing or similar member 8. This bushing 8 is provided with lugs or ears 9, and said lugs or ears 9 are perforated to receive bolts or other suitable fastening means 10. These bolts or other fastening means 10 are adapted to project through apertures in the radiator shell 6, which apertures are so positioned as to aline with the openings in the lugs or ears 9 in order that said bolts 10 may be passed therethrough.

Figure 2:
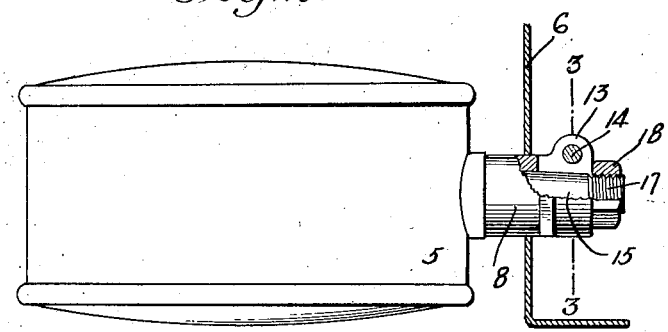
Fig. 2 is a top plan view of the vehicle lamp, the radiator shell and lamp support being broken away and shown in horizontal section.
Figure 3:
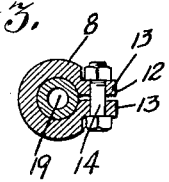
Fig. 3 is a detail vertical sectional view taken on the line 3—3 of Fig. 2.

The side walls of the radiator shells are often angularly disposed as shown in the drawings, and in order to compensate for this angular disposition of the side walls of the radiator shell, a filler block 11 is employed, this filler block being provided with an opening 10' for its reception of the bushing 8. As more clearly shown in Figs. 2 and 3, this bushing 8 is split as indicated by the reference character 12, and the split portion is provided with projecting ears 13 through which a bolt 14 is adapted to pass in order that the bushing 8 may be contracted when the nut on the bolt 14 is tightened.

The lamp 5 is provided with a tapered spindle 15 and said tapered spindle is adapted to be received within the tapered opening 16 of the sleeve 8. The inner end of this tapered spindle 15 is screw-threaded as indicated by the reference character 17, and adapted for engagement with the screw-threaded end 17 is a nut 18. This spindle is hollow as indicated by the reference character 19 in order that the conductor wires 20 may pass therethrough to the light.

The device is assembled in the following manner: The nut on the bolt 14 is first loosened to permit of expansion of the bushing 8. After this has been done the tapered spindle 15 of the lamp 5 is inserted in the bushing 8 and the nut 18 is then engaged with the threaded end 17 of the spindle 15 and tightened. The nut on the bolt 14 is now tightened to contract the opening 8 about the spindle 15 in such a manner as to prevent relative movement between the spindle 15 and the bushing 8.

When it is desired to adjust the light to direct the beam thereof, it is only necessary to loosen the nut 18 and the nut on the bolt 14, after which the spindle is free to rotate within the bushing 8 to lift or lower the beam of light.

From the foregoing it is apparent that the present invention provides a new and improved means for supporting vehicle lamps, and while the lamp has been described as a headlight, it is obvious that the construction disclosed in the present application may be employed wherever it is desired to support a lamp from a wall which is angularly disposed.

What is claimed is:

A lamp support comprising a socket in the form of a tubular member having a tapered internal passage, said tubular member being split to provide resiliency, oppositely disposed lugs carried by said split tubular member, a lamp, a tapered stem carried by the lamp and adapted to project through said tubular member, a screw-threaded extremity formed on said stem and adapted to receive a nut to prevent movement of the stem longitudinally of said tubular member, and a bolt passing through said lugs for contracting said tubular member about the stem to prevent rotary movement of the stem within the tubular member.

VICTOR W. PAGÉ.